United States Patent
Allsopp

(10) Patent No.: US 7,117,917 B2
(45) Date of Patent: Oct. 10, 2006

(54) BLIND FABRIC

(75) Inventor: Reginald Charles Allsopp, Stockport (GB)

(73) Assignee: Louver-Lite Limited, Cheshire (GB)

( * ) Notice: Subject to any disclaimer, the term of this patent is extended or adjusted under 35 U.S.C. 154(b) by 0 days.

(21) Appl. No.: 10/447,696

(22) Filed: May 29, 2003

(65) Prior Publication Data

US 2004/0020604 A1    Feb. 5, 2004

(30) Foreign Application Priority Data

May 30, 2002   (GB) .............................. 0212496.4

(51) Int. Cl.
*A47H 23/00*   (2006.01)
(52) U.S. Cl. ................................. 160/84.04
(58) Field of Classification Search ............ 160/84.01, 160/84.04, DIG. 7, 84.05, 264, 405
See application file for complete search history.

(56) References Cited

U.S. PATENT DOCUMENTS

| | | | | |
|---|---|---|---|---|
| 2,089,351 A | * | 8/1937 | English ....................... | 442/286 |
| 2,350,094 A | | 5/1944 | Butts .......................... | 160/114 |
| 3,322,182 A | | 5/1967 | Palella | |
| 3,487,875 A | | 1/1970 | Shukat et al. ................. | 160/84 |
| 3,777,800 A | * | 12/1973 | Susoev .................... | 160/84.04 |
| 4,501,311 A | | 2/1985 | Folland ...................... | 160/127 |
| 4,544,011 A | | 10/1985 | Sawamura ................... | 160/84 |
| 4,582,109 A | * | 4/1986 | Fairbanks ................. | 160/84.04 |
| 4,880,044 A | | 11/1989 | Judkins ........................ | 160/84 |
| 4,880,045 A | * | 11/1989 | Stahler ..................... | 160/84.04 |
| 4,934,435 A | * | 6/1990 | Regev ..................... | 160/84.04 |
| 4,974,656 A | | 12/1990 | Judkins ...................... | 160/84.1 |
| 5,090,466 A | | 2/1992 | Hong ........................ | 160/84.1 |
| 5,273,096 A | * | 12/1993 | Thomsen et al. ........ | 160/84.01 |
| 5,355,928 A | * | 10/1994 | Robertson ................ | 160/84.04 |
| 5,503,210 A | | 4/1996 | Colson et al. .......... | 160/84.05 |
| 5,551,500 A | | 9/1996 | Allsopp ................... | 160/84.04 |
| 5,566,734 A | | 10/1996 | Levy et al. ............. | 160/84.04 |
| 5,566,735 A | * | 10/1996 | Jelic ....................... | 160/84.04 |
| 5,690,156 A | * | 11/1997 | Ruggles ................... | 160/84.04 |
| 5,862,850 A | * | 1/1999 | Yang ....................... | 160/84.04 |
| 5,901,767 A | | 5/1999 | Ralton et al. ............ | 160/84.04 |
| 6,257,300 B1 | * | 7/2001 | Brownlie ................. | 160/84.01 |

FOREIGN PATENT DOCUMENTS

| | | |
|---|---|---|
| DE | 3418534 | 11/1985 |
| EP | 0451912 | 3/1991 |
| FR | 2283278 | 12/1976 |
| GB | 549745 | 12/1942 |
| GB | 1494842 | 12/1977 |
| GB | 1497354 | 1/1978 |
| GB | 2246593 | 5/1992 |
| GB | 2261691 | 5/1993 |
| GB | 2351519 | 3/2001 |

* cited by examiner

*Primary Examiner*—David Purol
(74) *Attorney, Agent, or Firm*—Haugen Law Firm PLLP

(57) ABSTRACT

A fabric for use in window blind systems, the fabric comprising a first fabric layer bound via an adhesive to a base fabric. The fabric is preferably formed into a Roman blind fabric by the provision of elongate, widthwise channels.

15 Claims, 3 Drawing Sheets

BLIND FABRIC

FIELD OF THE INVENTION

The present invention relates to an improved fabric for use in a window blind, more particularly, but not exclusively a fabric for use in the type of blinds known as Roman blinds. Further, the present invention relates to a Roman blind comprising said fabric which provides the advantages of conventional blind fabrics in addition to an enhanced aesthetic appearance and tactile properties.

BACKGROUND OF THE INVENTION

The term 'window' is used herein as a convenient reference with the understanding that the invention may also be used as a covering for doors or other architectural openings.

Fabrics conventionally used in window coverings are coated on at least one of their front and rear surfaces using a resin binder such that they are heat and light resistant, that they don't warp or cup and that they may be cut without the material fraying. However, this treatment results in a stiff dull fabric which does not drape well and has poor tactile properties. The fabric according to the present invention attempts to overcome or ameliorate at least some of these problems. It displays each of the properties afforded by presently available blind fabrics in addition to providing a comparatively soft, tactile fabric which is suitable for use in most types of fabric blinds.

SUMMARY OF THE INVENTION

According to a first aspect of the present invention there is provided a fabric for use in window blind systems, the fabric comprising a first fabric layer bound via an adhesive to a base fabric.

Preferably the base fabric is a non-woven fabric. Most preferably the base fabric will be a spun or melt bonded material.

It is surprising that this fabric exhibits no cupping or warping when hung. By cupping and warping it is meant that the fabric, when arranged in a planar configuration, does not deflect out of that plane in the absence of external forces and which, in use, exhibits substantially no shrinkage or distortion in any direction.

Additionally either fabric layer may comprise synthetic or natural materials, these may be woven or non-woven, for example knitted, spun bonded or melt bonded, materials. The material may be, as appropriate, coloured or non-coloured, opaque or translucent, resistant to fading, or resistant to heat or light transmission. Further, the fabric may be coated with stain resistant finishes. Preferably each of the fabric layers will independently have a weight range of 40 gsm to 400 gsm. In addition, either or both of the fabric layers may themselves be a laminate.

The adhesive used may be any adhesive suitable for adhering together the first fabric and the base fabric, such as a hot melt adhesive or a contact adhesive with or without a carrier film as will be readily apparent to a person skilled in the art. Preferably the adhesive will comprise a polyester, polyurethane, polyamide or polyolefin adhesive in a single or multi-layer format.

The adhesive preferably forms a layer between the first fabric and the base fabric. The term "layer" is intended to include a continuous layer of adhesive and also a discontinuous layer comprising discrete regions of adhesive. Preferably the adhesive will be present as a continuous layer between each of the fabric layers. More preferably the adhesive layer thickness will range from 25 to 200 µm and most preferably from 25 to 150 µm.

Additionally or alternatively the adhesive will preferably partially penetrate both fabric layers allowing bonding with the fibres of each, but will substantially not extend to the outwardly facing surface of the respective fabrics.

The fabric may be used in any fabric window blind assembly including, but not limited to pleated blinds, Roman blinds or roller blinds, but is preferably used in the construction of fabrics for use in Roman blinds.

According to a second aspect of the present invention there is provided a fabric according to the first aspect of the invention, which has been preformed into a "Roman blind fabric" by the provision of a plurality of widthwise channels adapted to receive therein scaffold elements, such that it facilitates the assembly of a Roman type blind by a non-skilled person.

Conventional Roman blinds comprise a sheet of fabric material arranged between a top rail (head rail) and a lifting bar. A plurality of vertically spaced horizontal channels adapted to receive respective scaffold elements are secured to or provided as part of the fabric sheet. In addition, one or more arrays of guide means are secured to or provided as part of the fabric sheet, wherein each array of guide means guides a respective lifting cord. The lifting cords are fixed at one end to the lifting bar. This arrangement results in a blind which may be raised or lowered by raising or lowering the lifting cords.

The preferred Roman blind fabric includes a plurality of vertically spaced horizontal channels, wherein vertical and horizontal refer to the in-use configuration of the fabric. Preferably the channels are formed by shaping the fabric such that elongate loops are created in the fabric, which may be secured in position by, for example, stitching, adhesive or heat bonding.

However, the channel-forming elements may be separate fabric elements fixed to the fabric e.g. by stitching, adhesive or heat bonding, or they may be formed as a polymeric tubular element.

Alternatively, the channel may be formed by a plurality of loops of a thread-like material. In this embodiment the loops may be formed during the construction of the fabric or they may be stitched into the fabric after its construction.

In a further alternative embodiment, the channel may be formed by a plurality of loops of a rigid material, for example, annular elements made from metal, wood or a polymeric material. These may be attached to the fabric by stitching or by any other suitable form of attachment.

In a yet further alternative embodiment, the channel may be formed from an elongate channel forming portion of the fabric, wherein the channel is formed during the construction of the fabric, for example, it may be formed during the weaving of the fabric for woven fabric.

The channels preferably extend across the entire width of the fabric. This makes possible the simple addition of the scaffold elements by threading each of these through a respective one of the pre-formed channels. Thus, the Roman blind fabric may be assembled by a person not skilled in the art of blind assembly to produce a Roman blind.

Preferably the channels will be regularly spaced along the vertical axis and of regular diameter. Most preferably the channels will be of an appropriate size to accommodate snugly a scaffold element. It is preferable that the channels be sized to have a diameter in the range 0.1–5.0 cm, preferably in the range 0.5–3.0 cm and most preferably in the range 0.5–2.0 cm.

According to a third aspect of the present invention there is provided a Roman blind comprising a Roman blind fabric according to the second aspect of this invention attached at a first end to a head rail and at a second end to a lifting bar. Each of the channels of the fabric includes a scaffold element located therein. The blind further includes at least one lifting cord extending from the head rail to the lifting bar, the or each lifting cord being guided by a respective array of guide elements secured to the fabric.

The scaffold element is preferably a rigid rod. A person skilled in the art will appreciate that the rod may be formed from wood, plastics such as nylon or polycarbonate, or metal such as extruded aluminium.

The guide element preferably comprises a clip which snap fits around a portion of the scaffold element, thereby trapping a portion of the fabric between the clip and the scaffold element, wherein the clip includes an 'eye' portion extending therefrom, the eye being sized to slidably receive therethrough a lifting cord. The clip is preferably C-shaped in cross section. Alternatively the guide element may comprise an eye portion and an attachment portion for attaching the guide element to the fabric. The attachment portion may be a T-shaped portion for attaching the guide element to the fabric. The attachment portion may be a shaped portion which passes through the fabric and resists removal of the guide element therefrom, or, alternatively, it includes a screw thread for attachment of the guide element to the scaffold element, thereby trapping the fabric between a part of the guide element and the scaffold element.

In assembly of the preferred blind, the scaffold elements are located in respective pre-formed channels in the Roman blind fabric. One or more vertical arrays of guide elements are secured to the fabric, preferably adjacent to a respective scaffold element, such that each array of guide elements guides a respective lifting cord. The lifting cords are passed through each of the guide elements in their respective arrays and fixed to the lifting bar. This arrangement results in a blind which may be raised or lowered by raising or lowering the lifting cords. Raising the lifting cords raises the lifting bar until it engages a first scaffold element. Both the lifting bar and the first scaffold element are then raised together via continued raising of the lifting cords until the first scaffold element engages a second scaffold element and so on until the blind fabric no longer covers the aperture (i.e. where the lifting bar and each of the scaffold elements are grouped together at the head rail) or until it is in the desired position at which point the blind may be locked in a position by an appropriate lifting cord locking mechanism for example located in the head rail.

When closed, such that the window is covered, each blind panel (i.e. the area of the blind fabric between neighbouring channels) may be planar or soft folded to form a tear drop shape. Soft folding may be achieved by the addition of a flexible connecting tape disposed between the head rail and the lifting bar and attached to the fabric, preferably adjacent to the horizontal channels, such that the unfolding of the blind is constrained by the connecting tape to a pre-defined maximum spacing between neighbouring channels. The connecting tape may be attached to the channels adjacent to some or all of the guide elements. In certain embodiments, the guide elements may be adapted also to attach the connecting tape to the channels of the fabric.

BRIEF DESCRIPTION OF THE DRAWINGS

An embodiment of the invention will now be described by way of non-limiting example only with reference to the accompanying drawings in which.

DETAILED DESCRIPTION OF THE PREFERRED EMBODIMENTS

For the avoidance of doubt it should be noted that in this specification reference to 'up' and 'down', 'width', 'height', 'upper', 'lower', 'vertical', 'horizontal', 'front', 'back' and related terms refers to the orientation that the components of the blind adopt when installed for normal use, as they are shown in the figures.

Figure 1:
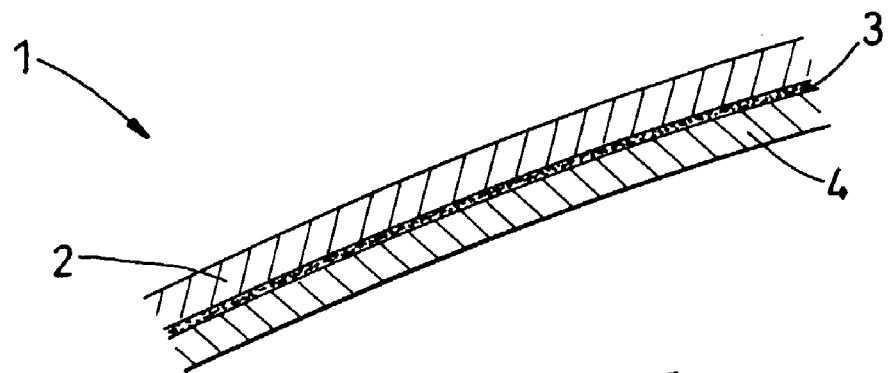
FIG. 1 is an enlarged cross-sectional view of the fabric according to the first aspect of the present invention.

FIG. 1 shows an enlarged portion of a laminated fabric 1, according to the first aspect of the present invention. The fabric 1 comprises three layers. A first layer of a woven face fabric 2, which is bound using a thin layer of hot melt adhesive 3 to a base fabric 4. The woven face fabric 2 of the present example is a woven 100% polyester Jacquard fabric of weight 130 gsm and the base fabric 4 is a spun lace of weight 40 gsm. The adhesive layer 3 comprises a polyolefin adhesive, such as "Xiro Polyolefin 30 micron" (trade mark, ex Sarna) or "Polyolefin 30 micron" (trade mark ex Faitplast).

The three layers are laminated together using a conventional laminating machine where they are subjected to heat of 130° C. and pressure of 300–400 kPa. This treatment activates the adhesive 3 and laminates the base fabric 4 to the woven face fabric 2. After lamination the adhesive layer 3 has a thickness of 50 μm.

Figure 2:
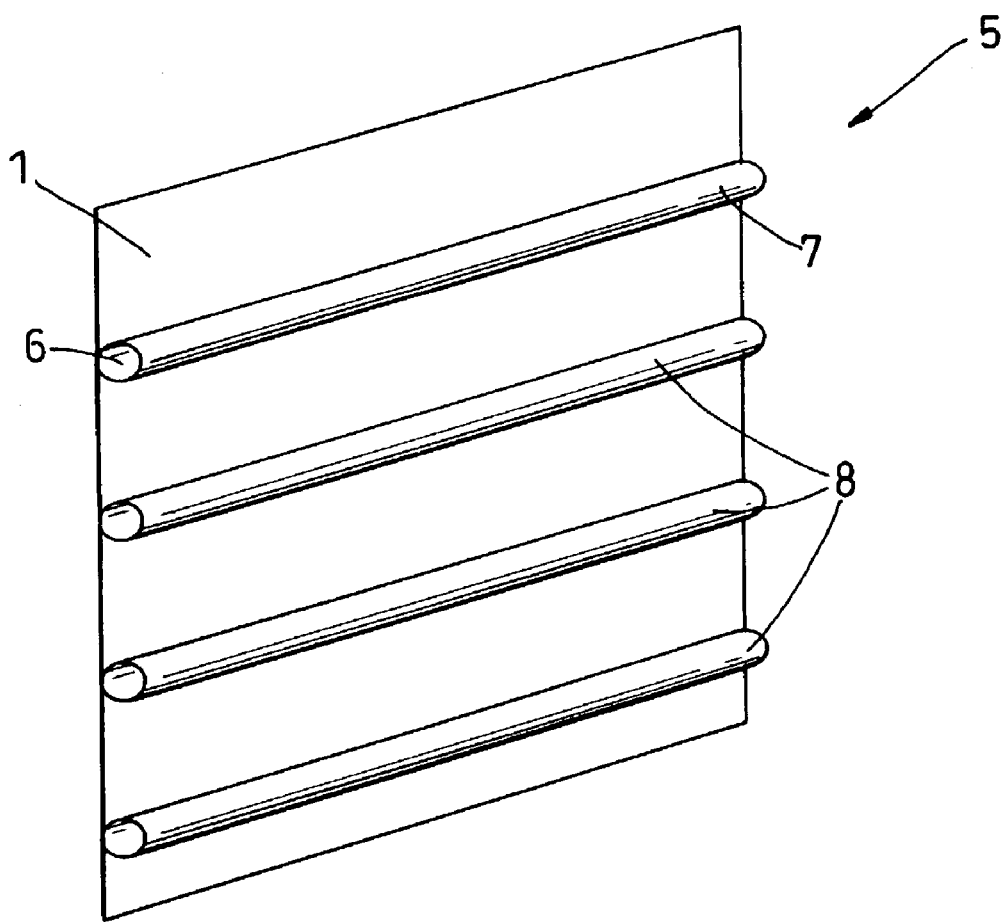
FIG. 2 is a view of the Roman blind fabric according to the second aspect of the present invention.

The fabric 1 is then further treated to pre-form a "Roman blind fabric" 5 according to the second aspect of the present invention (FIG. 2). Equally spaced horizontal fabric channels 6 are provided on the fabric 1 by the formation of elongate loops in the fabric 1 such that the internal surface of the loop 7 is the woven face fabric 2 and the external surface of the loop is the base fabric 4. The loop 7 is formed such that it extends substantially across the entire width of the fabric 1.

The term "front" as used herein is intended to mean the surface of the fabric which in use faces away from the window and the term "rear" as used herein is intended to mean the surface of the fabric which faces towards the window.

The Roman blind fabric 5 is formed by stitching the fabric loop 7 into the fabric 1 such that the fabric channel 6 is formed substantially across the entire width of the fabric 1, thereby providing regularly spaced channels 8 into which respective scaffold elements 9 may be located.

Figure 3:
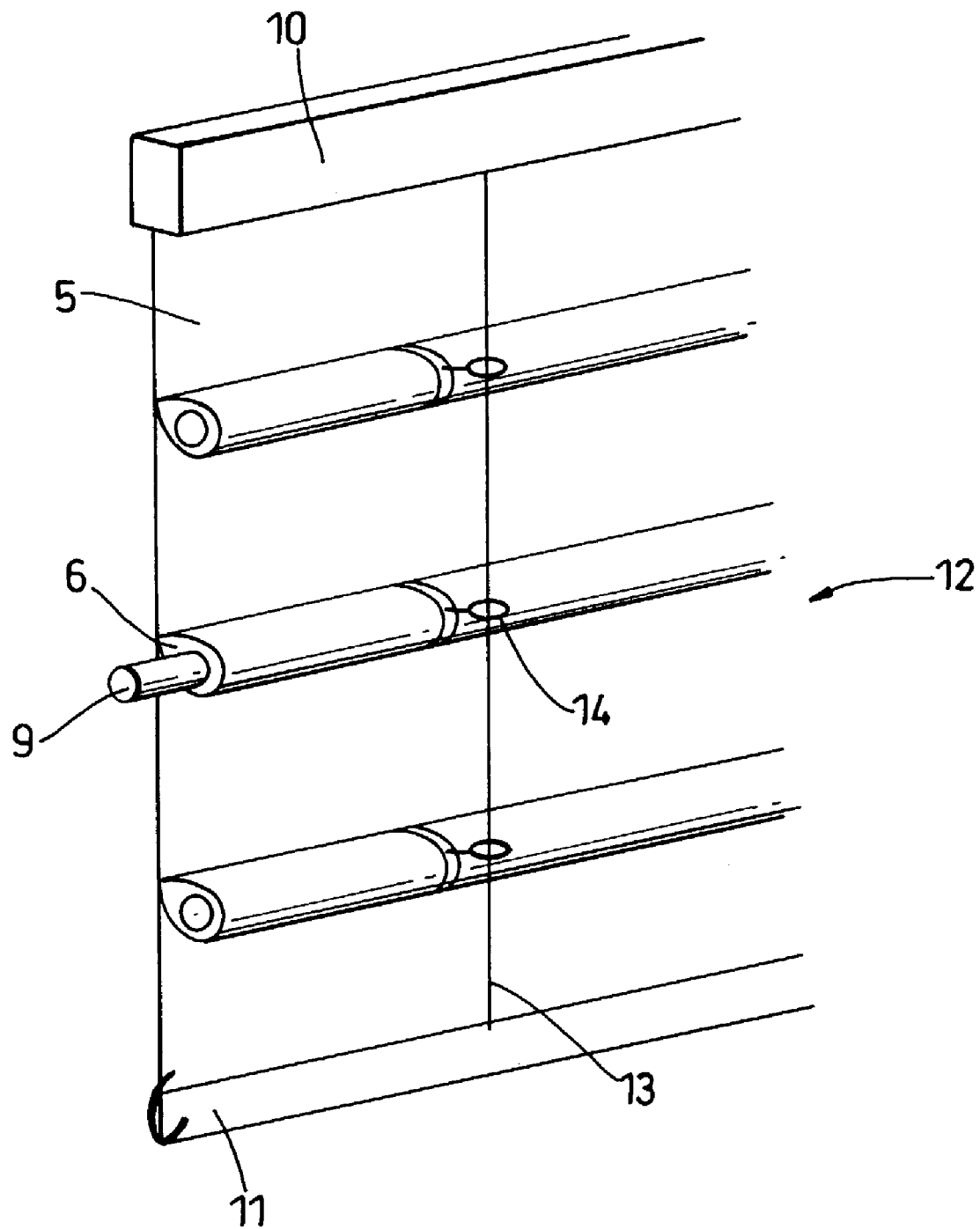
FIG. 3 is a view of the Roman blind according the third aspect of the present invention.

The Roman blind fabric 5 is attached, as shown in FIG. 3, at a first end to a conventional Roman blind head rail 10 and at a second end to a lifting bar 11 to provide a Roman blind 12 (FIG. 3). The scaffold elements 9 comprise rods of a conventionally used UV stabilised plastics material and each of the plurality of channels 8 have a scaffold element 9 located therein. The Roman blind 12 includes a plurality of lifting cords 13 extending between the head rail 10 and lifting bar 11. The lifting cords 13 are threaded through a plurality of respective guide elements 14, whereby each lifting cord 13 is guided by a respective vertical array of the guide elements 14.

Figure 4:
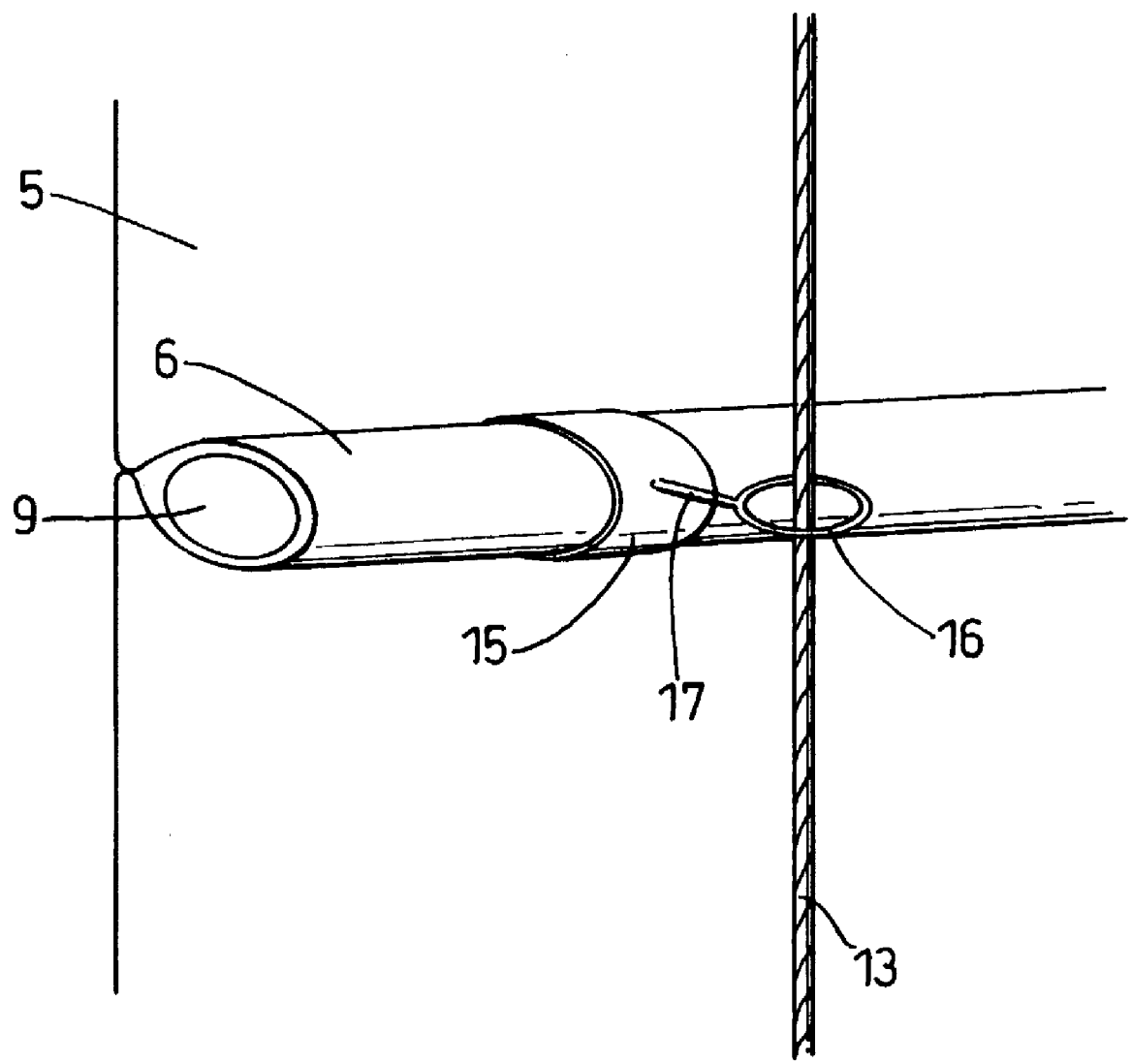
FIG. 4 is an enlarged view of the guide and scaffold elements of FIG. 3.

In the present embodiment of this invention the guide elements 14 comprise resiliently deformable snap-fit clips 15 having a C-shaped cross section and including a projecting 'eye' portion 16, through which a respective lifting cord 13 is threaded. The eye portion 16 extends from the clip element 15 via an arm 17 (FIG. 4). The guide elements 14 clip over a portion of a respective plastics rod 9, thereby trapping a portion of the blind fabric 5 between the clip 15 and the plastics rod 9. As the guide elements 14 are releasably secured to the blind fabric 5 they may be positioned or repositioned at any desired point along the length of the rod 9, i.e. at any point across the width of the blind fabric 5.

The remaining components of the Roman blind, such as the headrail 10 are conventional in their construction and arrangement and therefore will not be discussed in more detail herein.

From the above it will be evident that raising the lifting cords 13 will raise the lifting bar 11 until it makes contact with the first scaffold element 9. Further raising of the lifting cords 13 will raise both the lifting bar 11 and each subsequent scaffold element 9 until the lifting bar 11 and each of the scaffold elements 9 are grouped together at the headrail 10.

It will be apparent to those skilled in the art that various modifications, could be made to the specific embodiment described above within the scope of the present invention as defined in the appended claims.

The invention claimed is:

1. A Roman blind assembly for use in window blind systems comprising:
a fabric laminate which includes a first fabric layer, a base fabric layer, and an adhesive layer disposed between said first and base fabric layers, said first fabric layer being formed of a first material, and being adhesively bound in a continuously co-extensive relationship to said base fabric layer that is formed of a second material distinct from said first material, said fabric laminate having a plurality of elongate widthwise fabric channels being defined by respective inner surface boundaries that completely circumferentially enclose such fabric channels and are formed solely of said first fabric layer, and by respective outer surfaces formed of said base fabric layer, said fabric channels being specifically configured to operably receive respective scaffold elements therein.

2. A Roman blind assembly according to claim 1, wherein the base fabric layer is a non-woven fabric.

3. A Roman blind assembly according to claim 1 or claim 2, wherein each of the first fabric layer and the base fabric layer independently has a weight range of 40 gsm to 400 gsm.

4. A Roman blind assembly according to claim 1, wherein the adhesive layer has a thickness in the range of 25 to 200 μm.

5. A Roman blind assembly according to claim 1, wherein the adhesive layer is a hot melt adhesive or a contact adhesive.

6. A Roman blind assembly according to claim 5, wherein the adhesive layer is a polyester, a polyurethane, a polyamide, or a polyolefin-based adhesive.

7. A Roman blind assembly according to claim 1, wherein the adhesive layer substantially does not completely penetrate the first fabric layer or the base fabric layer.

8. A Roman blind assembly according to claim 1, wherein the channels are equally vertically spaced.

9. A Roman blind assembly according to claim 1, wherein the channels extend across substantially an entire width of the fabric laminate.

10. A method of forming a Roman blind assembly comprising:
providing a fabric laminate having a first fabric layer, a base fabric layer, and an adhesive layer disposed between said first and base fabric layers, said first fabric layer being formed of a first material, and being adhesively bound in a continuously co-extensive relationship to said base fabric layer that is formed of a second material distinct from said first material;
shaping the fabric laminate to form a plurality of elongate widthwise channels being defined by respective inner surface boundaries that completely circumferentially enclose such widthwise channels and are formed solely of said first fabric layer, and by outer surfaces formed of said base fabric layer;
securing each channel in place by either stitching or bonding the first fabric layer upon itself adjacent to the channel; and
inserting a scaffold element in each of said plurality of elongate widthwise channels.

11. A method of forming a Roman blind assembly comprising:
providing a fabric laminate having a first fabric layer, a base fabric layer, and an adhesive layer disposed between said first and base fabric layers, said first fabric layer being formed of a first material, and being adhesively bound in a continuously co-extensive relationship to said base fabric layer that is formed of a second material distinct from said first material;
providing a plurality of distinct channel forming elements; and
separately securing the channel forming elements to the fabric laminate.

12. A Roman blind assembly according to claim 1, further comprising a headrail and a lifting bar respectively disposed at opposed ends of said fabric laminate.

13. A Roman blind assembly according to claim 12, further comprising one or more vertical arrays of guide elements, wherein each guide element is secured to the fabric laminate and each vertical array of guide elements guides a respective lifting cord extending from the headrail to the lifting bar.

14. A Roman blind assembly according to claim 13, wherein the guide elements are secured to the fabric laminate by trapping a portion of the fabric laminate between the guide element and a respective one of said scaffold elements.

15. A Roman blind assembly for use in window blind systems comprising:
a fabric laminate which includes only a first fabric layer, a base fabric layer, and an adhesive material disposed between said first and base fabric layers, said first fabric layer being formed of a first material, and being adhesively bound in a continuously co-extensive relationship to said base fabric layer that is formed of a second material distinct from said first material, said fabric laminate having a plurality of elongate widthwise fabric channels being defined by respective inner surface boundaries that completely circumferentially enclose such fabric channels and are formed solely of said first fabric layer, and by respective outer surfaces formed of said base fabric layer, said fabric channels being specifically configured to operably receive respective scaffold elements therein.

* * * * *